(12) United States Patent
Fujimoto et al.

(10) Patent No.: US 9,295,976 B2
(45) Date of Patent: Mar. 29, 2016

(54) CATALYST FOR PRODUCING HYDROCARBON FROM SYNGAS, METHOD FOR PRODUCING CATALYST, METHOD FOR REGENERATING CATALYST, AND METHOD FOR PRODUCING HYDROCARBON FROM SYSNGAS

(75) Inventors: Kenichiro Fujimoto, Tokyo (JP); Noriyuki Yamane, Tokyo (JP)

(73) Assignee: NIPPON STEEL ENGINEERING CO., LTD, Tokyo (JP)

( * ) Notice: Subject to any disclaimer, the term of this patent is extended or adjusted under 35 U.S.C. 154(b) by 0 days.

(21) Appl. No.: 12/310,409

(22) PCT Filed: Aug. 27, 2007

(86) PCT No.: PCT/JP2007/067083
§ 371 (c)(1),
(2), (4) Date: Feb. 23, 2009

(87) PCT Pub. No.: WO2008/023851
PCT Pub. Date: Feb. 28, 2008

(65) Prior Publication Data
US 2010/0240777 A1    Sep. 23, 2010

(30) Foreign Application Priority Data

Aug. 25, 2006  (JP) ................. 2006-229135

(51) Int. Cl.
*B01J 23/00* (2006.01)
*B01J 25/00* (2006.01)
(Continued)

(52) U.S. Cl.
CPC  *B01J 23/75* (2013.01); *B01J 21/08* (2013.01); *B01J 35/002* (2013.01);
(Continued)

(58) Field of Classification Search
USPC .......................... 502/325, 100, 103, 104, 106
See application file for complete search history.

(56) References Cited

U.S. PATENT DOCUMENTS

| 4,499,209 A | 2/1985 | Hoek et al. |
| 6,740,621 B2* | 5/2004 | Singleton ................. B01J 21/04 423/626 |

(Continued)

FOREIGN PATENT DOCUMENTS

| AU | 46119/85 | 2/1986 |
| CN | 1230901 A | 10/1999 |

(Continued)

OTHER PUBLICATIONS

International Search Report dated Oct. 23, 2007 issued in corresponding PCT Application No. PCT/JP2007/067083.

(Continued)

*Primary Examiner* — James McDonough
(74) *Attorney, Agent, or Firm* — Kenyon & Kenyon LLP

(57) ABSTRACT

A catalyst for F-T synthesis which exhibits high activity, long life, and high water resistance without deteriorating strength and attrition resistance is disclosed. A method for producing such a catalyst, a method for regenerating such a catalyst, and a method for producing a hydrocarbon by using such as catalyst are also disclosed. Specifically, a catalyst for producing a hydrocarbon from a syngas, wherein cobalt metal, or cobalt metal and cobalt oxides; and zirconium oxides are supported by a catalyst support mainly composed of silica, is disclosed. This catalyst is characterized in that the content of impurities of the catalyst 0.01 mass % to 0.15 mass %. Specifically, a method for producing such a catalyst, a method for regenerating such a catalyst, and a method for producing a hydrocarbon by using such a catalyst are also disclosed.

31 Claims, 1 Drawing Sheet

(51) Int. Cl.
*B01J 29/00* (2006.01)
*B01J 31/00* (2006.01)
*B01J 37/00* (2006.01)
*B01J 23/75* (2006.01)
*B01J 21/08* (2006.01)
*B01J 35/00* (2006.01)
*B01J 37/02* (2006.01)
*B01J 37/06* (2006.01)
*C10G 2/00* (2006.01)
*B01J 33/00* (2006.01)
*B01J 35/02* (2006.01)
*B01J 35/08* (2006.01)

(52) U.S. Cl.
CPC ......... *B01J 37/0201* (2013.01); *B01J 37/0207* (2013.01); *B01J 37/06* (2013.01); *C10G 2/332* (2013.01); *B01J 33/00* (2013.01); *B01J 35/023* (2013.01); *B01J 35/08* (2013.01)

(56) References Cited

U.S. PATENT DOCUMENTS

| | | | |
|---|---|---|---|
| 2001/0036967 A1* | 11/2001 | Singleton | B01J 21/04 518/720 |
| 2001/0051663 A1* | 12/2001 | Lapidus | B01J 23/75 518/722 |
| 2002/0028745 A1 | 3/2002 | Krylova et al. | |
| 2004/0122116 A1* | 6/2004 | Choudhary et al. | 518/726 |
| 2004/0214904 A1 | 10/2004 | Singleton et al. | |
| 2006/0223693 A1* | 10/2006 | Fujimoto et al. | B01J 21/08 502/60 |

FOREIGN PATENT DOCUMENTS

| | | |
|---|---|---|
| CN | 1771086 | 5/2006 |
| EP | 0 510 771 | 10/1992 |
| EP | 0 533 227 | 3/1993 |
| JP | 59-102440 A | 6/1984 |
| JP | 05-84444 A | 4/1993 |
| JP | 5-208141 | 8/1993 |
| JP | 2002-512651 T | 4/2002 |
| JP | 2003-500188 | 1/2003 |
| JP | 2003-519010 | 6/2003 |
| JP | 2003-519011 | 6/2003 |
| JP | 2004-322085 | 11/2004 |
| JP | 2004-535271 T | 11/2004 |
| JP | 2006-022283 A | 1/2006 |
| RU | 2165789 | 4/2001 |
| RU | 2310508 | 11/2007 |
| WO | WO 98/50490 | 11/1998 |
| WO | 99/00190 A1 | 1/1999 |
| WO | WO 99/00191 | 1/1999 |
| WO | WO 00/71253 | 11/2000 |
| WO | WO 01/28962 A1 | 4/2001 |
| WO | WO 01/49809 | 7/2001 |
| WO | WO 02/076600 | 10/2002 |
| WO | WO 2005/099897 A1 | 10/2005 |

OTHER PUBLICATIONS

R. Oukaci et al., "Comparison of patented Co F-T catalysts using fixed-bed and slurry bubble column reactors,"(1999) Applied Catalysis A: General, 186, pp. 129-144.

J. Chen et al., "Influence of a silica gel on performance of a $Co/SiO_2$ catalyst for Fischer-Tropsch," (2000) Chinese Journal of Catalysis, vol. 21, No. 2, pp. 169-171 with English Translation thereof.

Office Action issued on the counterpart Chinese Patent Application No. 200780031350.2 on Mar. 15, 2011 with English translation.

European Office Action dated Sep. 8, 2011, issued in corresponding European Patent Application No. 07806556.2.

M.P. McDaniel, "Surface Halides of Silica. 1. Chloride", *The Journal of Physical Chemistry*, vol. 85, No. 5, 1981, pp. 532-537.

Office Action dated Mar. 8, 2011, in Japanese Patent Application No. 2007-220198.

Kazansky et al., "Infrared Diffuse Reflectance Study of Alkali Promoted Iron/Alumina and Cobalt/Alumina Fischer-Tropsch Catalysts Prepared by Decomposition of Carbonyls", Applied Catalysis,40 (1988) pp. 17-25.

Guerrero-Ruiz et al., "Carbon monoxide hydrogenation over carbon supported cobalt or ruthenium catalysts. Promoting effects of magnesium, vanadium and cerium oxides" Applied Catalysis A: General, 120 (1994) pp. 71-83.

Tavasoli et al., "Lowering methane and raising distillates yields in Fischer—Tropsch synthesis by using promoted and unpromoted cobalt catalysts in a dual bed reactor", Fuel Processing Technology,87 (2006), pp. 641-647.

Lahtinen et al., "The effects of promoters in carbon monoxide hydrogenation on cobalt foil model catalysts", Journal of Molecular Catalysis A: Chemical,130 (1998) pp. 255-260.

Zhang et al., "Effect of magnesia on alumina-supported cobalt Fischer—Tropsch synthesis catalysts", Journal of Molecular Catalysis A: Chemical,237, (2005) 172-181.

Russian Decision on Grant dated Jul. 5, 2011 issued in corresponding Russian Application No. 2009107927/04 [with English translation].

Office Action issued on Oct. 28, 2015 in a corresponding Chinese Application No. 201410408932.4.

Office Action issued on Oct. 28, 2015 in a corresponding Chinese Application No. 201410408732.4.

* cited by examiner

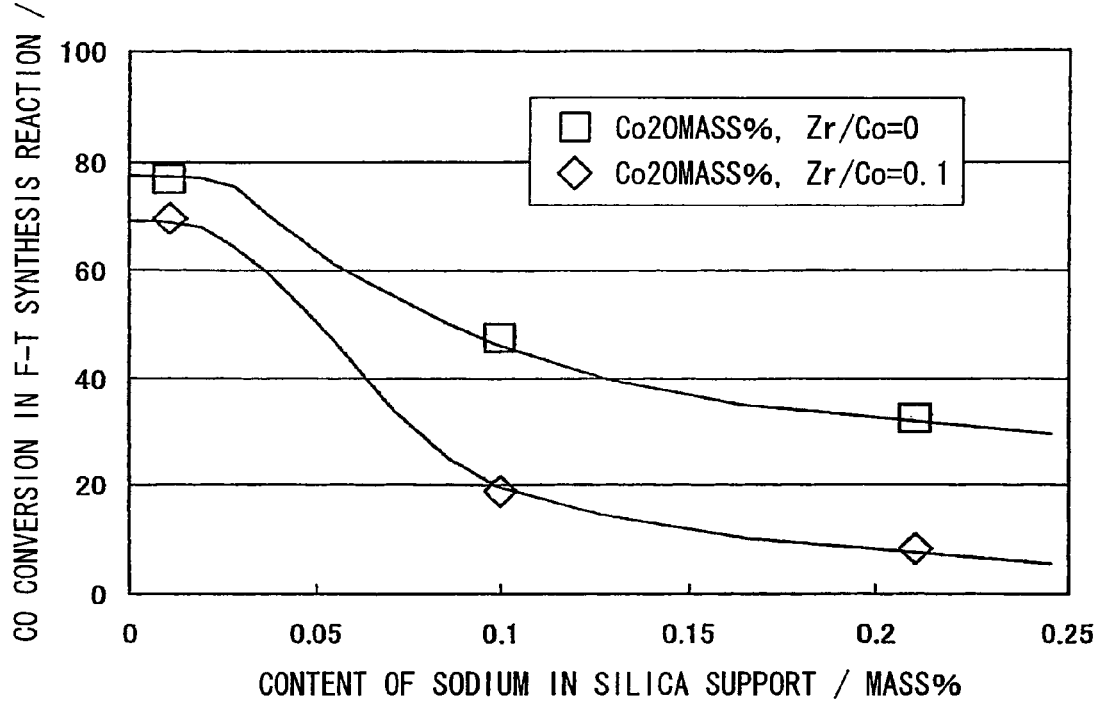
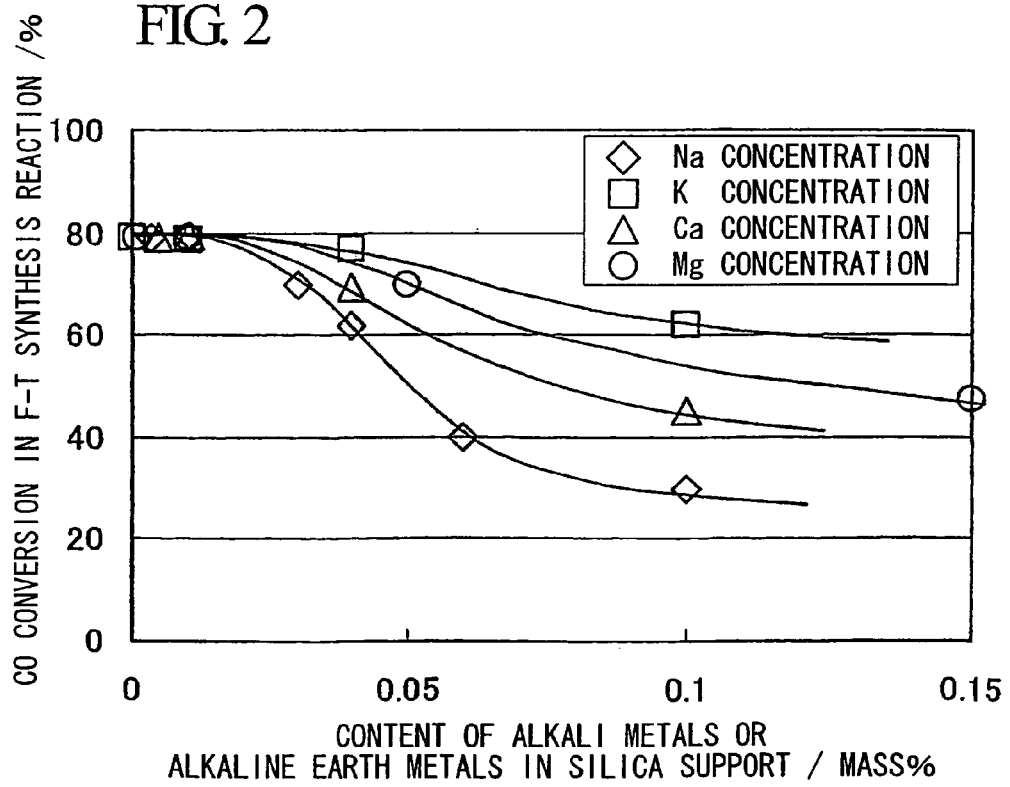

US 9,295,976 B2

CATALYST FOR PRODUCING HYDROCARBON FROM SYNGAS, METHOD FOR PRODUCING CATALYST, METHOD FOR REGENERATING CATALYST, AND METHOD FOR PRODUCING HYDROCARBON FROM SYSNGAS

DESCRIPTION OF THE RELATED ART

Priority is claimed on Japanese Patent Application No. 2006-229135, filed Aug. 25, 2006, the content of which is incorporated herein by reference.

TECHNICAL FIELD

The present invention relates to a catalyst for producing a hydrocarbon from a so-called syngas mainly composed of carbon monoxide and hydrogen, a method for producing such a catalyst, a method for regenerating such a catalyst, and a method for producing a hydrocarbon by using such a catalyst.

BACKGROUND ART

In recent years, environmental problems, such as global warming, have come to light. The importance of natural gas, which has high H/C ratio compared with other hydrocarbon fuels, coal, etc., can suppress the amount of carbon dioxide emissions, and also has rich reserves, has been reviewed. It is expected that the demand for natural gas will increase more and more in the future. Under such circumstances, there are great many small and middle gas fields found in the regions of Southeast Asia, Oceania and so forth, which however are still left undeveloped due to their locations of distant places having no infrastructure such as a pipeline and an LNG plant, requiring a huge amount of investment for the infrastructure being in comparable to their minable reserves, so that their developments have been desired to be processed. As one of the effective developing means of the gas fields, after natural gas is converted into syngas, development of a technology of converting natural gas into syngas and then the syngas into liquid hydrocarbon fuels, such as kerosene and light oil, which are excellent in transportability and handling ability, by using a Fischer-Tropsch (F-T) synthesis reaction is energetically performed in many places.

F-T synthesis reaction formula:

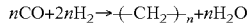

$$nCO+2nH_2 \rightarrow (-CH_2-)_n + nH_2O$$

This F-T synthesis reaction is an exothermic reaction which converts a syngas into a hydrocarbon by using a catalyst, so it is very important to effectively remove heat of reaction for a stable operation of the plant. As effective reaction types up to now, there are gas-phase synthesis processes (a fixed-bed, an entrained-bed, a fluidized-bed reactor) and a liquid-phase synthesis process (a slurry-bed reactor). Although these processes have various features, attention has recently been paid to a slurry bed liquid-phase synthesis process which is high in heat removal efficiency, and does not cause accumulation of generated a high boiling point hydrocarbon onto a catalyst, or the following plugging of a reaction tube. This process is being developed energetically.

Generally, it is preferable that the activity of a catalyst be higher and higher. However, especially in the slurry-bed reactor, in order to maintain an excellent slurry fluidized state, there exists a limit in that it is necessary to set the concentration of slurry to a certain value or less. Therefore, making the activity of the catalyst higher becomes a very important factor in expanding the degree of freedom of process design. The activity of various F-T synthesis catalysts which have been reported up to now is at most about 1 (kg-hydrocarbon/kg-catalyst/hr) with a general index of productivity of a liquid hydrocarbon which carbon number is 5 or more. This is not enough from the above viewpoint (R. Oukaci et al: Applied Catalysis A: General, 186 (1999) 129 to 144).

As one of methods for improving the activity of the catalyst, there is a report that it is effective to reduce the content of sodium in silica used as a catalyst support (J. Chen: Cuihua Xuebao Vol. 21, 2000, Pages 169 to 171). However, in this report, there is only comparison between the catalyst which sodium content is below 0.01 mass % and the catalyst which sodium content is about 0.3 mass %, but there is no specific description that an effect is exhibited by reducing the sodium content to a certain extent.

Additionally, as a result of elaborate studies to an effect of impurities, such as alkali metals and alkaline earth metals, on the activity of a catalyst, there is an example in which the activity is greatly improved as compared with a conventional catalyst by adopting a catalyst which impurity concentration is within a certain range (refer to Japanese Unexamined Patent Application Publication No. 2004-322085).

Additionally, generally, the particle size of the catalyst for the F-T synthesis reaction is preferably smaller from a viewpoint of lowering the possibility that the diffusion of heat or substance becomes rate-determining level. However, in the F-T synthesis reaction by the slurry-bed reactor, a high boiling point hydrocarbon among hydrocarbons to be generated are accumulated within a reaction container. Therefore, the solid-liquid separating operation between the catalyst and a product is necessarily needed. Thus, when the particle size of the catalyst is too small, the problem that the efficiency of a separating operation is greatly degraded occurs. Hence, an optimal particle size range exists in the catalyst for the slurry-bed reactor, and is generally about 20 to 250 μm. As a mean particle size, 40 to 150 μm is preferable. However, as shown below, the catalyst may be broken or powdered during a reaction, and the particle size may become small. Thus, attention is required.

That is, in the F-T synthesis reaction in the slurry-bed reactor, operation is often made at a relatively high material-gas superficial velocity (0.1 m/second or more), and catalyst particles collide violently with each other during a reaction. Therefore, when physical strength or attrition resistance (powdering resistance) is not enough, the particle size of the catalyst may decrease during a reaction, and inconvenience may be caused in the above separating operation. Moreover, a lot of water is obtained as a by-product in the F-T synthesis reaction. However, when a catalyst which has low water resistance, and is apt to cause strength reduction, breakage, and powdering due to water is used, the particle size of the catalyst may become fine during a reaction. Thus, inconvenience will be caused in the separating operation similarly to the above.

Additionally, generally, in order to have the optimal particle size as described above, the catalyst for the slurry-bed reactor is pulverized to be adjusted in particle size, and then it is provided for practical use. Meanwhile, in such a crushed catalyst, often, precracking is performed and acute projections are created. Thus, the catalyst is inferior in mechanical strength or attrition resistance. Therefore, when being used for the slurry bed F-T synthesis reaction, the catalyst is broken, and is finely powdered. As a result, there is a drawback in that the separation between the high boiling point hydrocarbon to be generated and the catalyst became significantly difficult. Additionally, when porous silica is used as a catalyst support for the F-T synthesis reaction, it is widely known that a catalyst with relatively high activity is obtained. However, when adjustment of particle size by crushing has been performed, due to the reasons as described above, often, silica is low in water resistance and is apt to be broken and powdered by the existence of water as well as strength being degraded. Therefore, this often becomes a problem especially in the slurry-bed reactor.

Additionally, under a reaction atmosphere in which the water which is generated as a by-product by the F-T reaction exists in large quantities (especially under an atmosphere of high CO conversion), a phenomenon that catalytic activity decreases occurs and the decrease is because cobalt silicates are formed mainly at an interface between loaded cobalt that is an active metal and a silica support, or the loaded cobalt itself is oxidized or sintering occurs. This became a problem. Additionally, since this phenomenon also leads to accelerating the deterioration rate of the catalyst with the lapse of time, i.e., reducing catalyst life, this became a factor which increases operating cost. These can be described by the wording that the water resistance of cobalt particles showing activity is low. Especially under an atmosphere where the CO conversion is high, the partial pressure of by-product water increases, and thereby, deterioration rate increases. As a result, the above decrease in catalytic activity appears noticeably. However, even under an atmosphere where the CO conversion is not as high as 40 to 60%, progress of decrease in catalytic activity will be made at a relatively low speed according to the partial pressure of the by-product water. Accordingly, it is important to improve water resistance even on the condition that the CO conversion is relatively low from a viewpoint of the catalyst life. With respect to the inhibition of formation of cobalt silicate, and an improvement in activity, it is considered that addition of zirconium is effective. However, in order to exhibit the effect of the zirconium, a large amount zirconium which is about half of the mass of cobalt is required, or even if a large amount of zirconium is added, the effect thereof was not satisfactory (refer to U.S. Pat. No. 6,740,621 B2).

The factors involved in a decrease in catalytic activity may include precipitation of carbon on the surface of cobalt or at an interface between supported cobalt and the silica support in addition to the above. By covering the surface of cobalt with a carbon component, the surface area of cobalt which can contact a material-gas will be reduced, and the catalytic activity will decrease. In addition; poisoning by a sulfur component, a nitrogen component, etc. in the material-gas, or sintering whereby cobalt metal may agglomerate during a reaction is common.

When a catalyst which activity has decreased falls below an activity level due to the factors, it is necessary to replace or regenerate the catalyst in order to maintain the performance of a reaction process. In the slurry-bed reactor, there is a feature that the catalyst which activity has decreased can be replaced without stopping a reaction. However, if it is possible to regenerate the catalyst which activity has decreased, a replacement catalyst for maintaining reaction performance is not needed, or the amount of replacement can be reduced. Therefore, production cost can be reduced.

DISCLOSURE OF THE INVENTION

The invention, which aims at improving the activity of a catalyst for producing a hydrocarbon from a syngas, and suppressing a decrease in activity caused by sintering, precipitation of carbons or by-product water, provides a catalyst for producing a hydrocarbon from a syngas, which is capable of being stably used even under the condition of a high CO conversion where by-product water is generated in large quantities, and has long life, a method for producing such a catalyst, a method for regenerating such a catalyst, and a method for producing a hydrocarbon by using such a catalyst.

The invention relates to a catalyst for F-T synthesis with high water resistance, high activity, and long life, a method for producing such a catalyst, and a method for producing a hydrocarbon by using such a catalyst. More specifically, the invention is as described in detail below.

(1) A catalyst for producing a hydrocarbon from a syngas, which comprises cobalt metal, or cobalt metal and cobalt oxides; and zirconium oxides supported by a catalyst support mainly composed of silica, wherein a content of impurities of the catalyst is from 0.01 mass % to 0.15 mass %.

(2) The catalyst for producing a hydrocarbon from a syngas described in (1), wherein the impurities of the catalyst are simple substances and compounds of sodium, potassium, calcium, magnesium, and iron.

(3) The catalyst for producing a hydrocarbon from a syngas described in (1) or (2), wherein the content of the impurities in the catalyst is from 0.01 mass % to 0.03 mass %.

(4) The catalyst for producing a hydrocarbon from a syngas described in any one of (1) to (3), wherein the loading amount of cobalt metal, or cobalt metal and cobalt oxides in the catalyst is 5 to 50 mass % in terms of cobalt metal, and the loading amount of zirconium oxides is 0.03 to 0.6 in the molar ratio of Zr/Co.

(5) The catalyst for producing a hydrocarbon from a syngas described in any one of (1) to (4), wherein the content of alkali metals or alkaline earth metals among the impurities contained in the catalyst support is less than or equal to 0.1 mass %.

(6) The catalyst for producing a hydrocarbon from a syngas described in any one of (1) to (4), wherein the content of each of sodium, potassium, calcium, and magnesium among the impurities contained in the catalyst support is less than or equal to 0.02 mass %.

(7) The catalyst for producing a hydrocarbon from a syngas described in any one of (1) to 6, wherein the catalyst support is spherical.

(8) A method for producing the catalyst described in any one of (1) to (7) for producing a hydrocarbon from a syngas, wherein the catalyst is produced by causing cobalt compounds and zirconium compounds to be simultaneously supported by the catalyst support mainly composed of silica by using an impregnation method, an incipient wetness method, a precipitation method, or an ion-exchange method, and then by performing reduction treatment, or calcination treatment and reduction treatment.

(9) The method for producing the catalyst described in any one of (1) to (7) for producing a hydrocarbon from a syngas, wherein the catalyst is produced by causing cobalt compounds and zirconium compounds to be separately supported by the catalyst support mainly composed of silica by using an impregnation method, an incipient wetness method, a precipitation method, or an ion-exchange method, and after loading of a first compounds, drying treatment, or drying treatment and calcination treatment is performed, and after loading of another remaining compounds, reduction treatment, or calcination treatment and reduction treatment is performed.

(10) The method for producing a catalyst for producing a hydrocarbon from a syngas described in (9), wherein, in the separately loaded compounds, the first loaded compounds are zirconium compounds and the other remaining loaded compounds are cobalt compounds.

(11) The method for producing a catalyst for producing a hydrocarbon from a syngas described in any one of (8) to (10), wherein the loaded zirconium compounds and cobalt compounds, as raw materials for production in the impregnation method, the incipient wetness method, the precipitation method, or the ion-exchange method, contain alkali metals or alkaline earth metals within a range of 0 to 5 mass %.

(12) The method for producing a catalyst for producing a hydrocarbon from a syngas described in any one of (8) to (11), wherein the catalyst support mainly composed of silica is produced by gelating silica sol generated by mixing an alkali silicate aqueous solution and an acid aqueous solution together, subjecting the resulting product to at least any one of acid treatment and water washing treatment, and then drying it.

(13) The method for producing a catalyst for producing a hydrocarbon from a syngas described in (12), wherein water in which content of alkali metals or alkaline earth metals is from 0 to 0.06 mass % is used in at least any one of the acid treatment and the water washing treatment after the gelation of the silica sol.

(14) The method for producing a catalyst for producing a hydrocarbon from a syngas described in (12) or (13), wherein the gelation is performed by spraying the silica sol into a gas medium or a liquid medium to mold the silica sol in a spherical shape.

(15) The method for producing a catalyst for producing a hydrocarbon from a syngas described in any one of (8) to (14), wherein the cobalt compounds and the zirconium compounds are supported by the catalyst support mainly composed of silica after the concentration of the impurities is reduced by performing cleaning by using at least any one of water, acid, and alkali.

(16) The method for producing a catalyst for producing a hydrocarbon from a syngas described in (15), wherein the cleaning uses one or both of acid and ion-exchange water.

(17) A method for producing a hydrocarbon from a syngas by using the catalyst described in any one of (1) to (7), wherein synthesis is carried out by a liquid-phase reaction using a slurry-bed reactor.

(18) The method for producing a hydrocarbon from a syngas by using the catalyst described in any one of (1) to (7), wherein synthesis is carried out by a liquid-phase reaction using a slurry-bed reactor with an external circulation system.

(19) The method for producing a hydrocarbon from a syngas described in (17) or (18), wherein, in the liquid-phase reaction, catalyst amount, material-gas supply amount, reaction temperature, and reaction pressure are adjusted, and a one-pass CO conversion is set to be between 40 and 95%.

(20) The method for producing a hydrocarbon from a syngas described in (17) or (18), wherein, in the liquid-phase reaction, catalyst amount, material-gas supply amount, reaction temperature, and reaction pressure are adjusted, and a one-pass CO conversion is set to be between 60 and 95%.

(21) A method for regenerating a catalyst which activity has decreased after a hydrocarbon is produced from a syngas by using the catalyst described in any one of (1) to (7), wherein the catalyst which activity has decreased is supplied with a regeneration gas containing hydrogen, and thereby, the catalyst and the regeneration gas are brought into contact with each other.

(22) A method for regenerating a catalyst which activity has decreased after a hydrocarbon is produced from a syngas within the reactor, which is filled with the catalyst described in any one of (1) to (7), wherein the reactor is supplied with a regeneration gas containing hydrogen, and thereby, the catalyst and the regeneration gas are brought into contact with each other.

(23) A method for regenerating a catalyst which activity has decreased after a hydrocarbon is produced from a syngas by the method described in (18), wherein any of an external circulation portion is supplied with a regeneration gas containing hydrogen, and thereby, the catalyst and the regeneration gas are brought into contact with each other.

According to the invention, it is possible to provide a high-activity catalyst for F-T synthesis, which is high in water resistance, is small in a degree to which the strength and activity of the catalyst are damaged, is extremely high in stability, and is long in life, as a catalyst containing a silica support, and cobalt particles showing activity even under the condition of a high CO conversion where by-product water is generated in large quantities, and a method for producing such a catalyst. Additionally, it is possible to perform regeneration even if activity decreases, and to perform the F-T synthesis reaction having high hydrocarbon productivity by the catalyst.

BRIEF DESCRIPTION OF THE DRAWINGS

FIG. 1 is a view showing the relationship between the content of sodium in a silica support and the CO conversion in the F-T synthesis reaction, in a catalyst in which zirconium oxides and cobalt are supported by the silica support, and in a catalyst in which cobalt is supported by a silica support.

FIG. 2 is a view showing the relationship between the content of alkali metals or alkaline earth metals in the silica support, and the CO conversion in the F-T synthesis reaction, in the catalyst in which cobalt is supported by the silica support.

BEST MODE FOR CARRYING OUT THE INVENTION

Hereinafter, the invention will be described in more detail.

The present inventors have found out that, when a catalyst with little impurity content in which cobalt metal, or cobalt metal and cobalt oxides; and zirconium oxides are supported by a catalyst support mainly composed of silica is compared with a catalyst with little impurity content in which cobalt metal, or cobalt metal and cobalt oxides are supported by the catalyst support, but zirconium oxides are not supported by the catalyst support, water resistance is significantly improved especially under the condition of a high CO conversion; catalyst life is also increased under the condition of a relatively low CO conversion; activity is further improved; and catalyst regeneration became easy. And then they have conceived the invention. Additionally, it is possible to provide and produce a catalyst having high attrition resistance and high strength without deteriorating activity by using a spherical catalyst support having specific physical properties. In addition, the term "impurities in a catalyst" in the invention also include impurities in a catalyst support mainly composed of silica.

The catalyst according to the invention is a cobalt-based catalyst having activity in the F-T synthesis reaction, and those mainly composed of silica are selected and used as the catalyst support. The term "catalyst support mainly composed of silica" includes a catalyst support containing a small amount of inevitable impurities in a process for producing a silica support other than silica, or those containing alumina and/or zeolite in the catalyst support, for example, when an acid site is introduced. (Hereinafter, the catalyst support mainly composed of silica is also simply referred to as "silica support"). In addition, the term "inevitable impurities" are impurities (metal and metallic compound) containing metal which has an effect on catalytic performance, which are impurities contained in cleaning water to be used in the process for producing a silica support, impurities contained in a starting material, and impurities mixed from a apparatus for catalyst production. When an apparatus, a raw material, and cleaning water to be used for production of a general catalyst for the F-T synthesis reaction are used, metallic elements of the impurities include sodium, potassium, calcium, magnesium, iron, and aluminum. However, the aluminum that is an impurity element is not an inevitable impurity which has an effect on the catalytic performance in the invention because most aluminum oxides contained in silica as a starting material of a silica support exist in the form of alumina or a zeolite in the silica support. Accordingly, the impurities in a catalyst in this invention are sodium, potassium, calcium, magnesium, and iron when an apparatus, a raw material, and cleaning water to be used for production of a general catalyst for the F-T synthesis reaction are used. In addition, sodium and potassium are mixed mainly from sodium silicate to be used as a raw material for producing a silica support, calcium and magnesium are mixed mainly from cleaning water, and iron is mixed mainly from silica that is a raw material, cleaning water, or a producing apparatus. Additionally, it is also necessary to consider other impurities depending on facilities or operating conditions in production of a catalyst so long as the impurities can be mixed.

It is sufficient if the loading method is performed by a typical impregnation method, incipient wetness method, precipitation method, ion-exchange method, or the like. As zirconium compounds or cobalt compounds which are a raw material (precursor) used for loading, the compounds are not particularly limited so long as their counter ions (($CH_3COO$)—) in $Co(CH_3COO)_2$, for example, in the case of acetate) are volatilized or decomposed when reduction treatment, or calcination treatment and reduction treatment is performed after loading, and they are dissolved in a solvent. Although acetates, nitrates, carbonates, chlorides, etc. can be used, it is preferable to use water-soluble compounds capable of using an aqueous solution when being loaded in order to reduce production cost or secure a safe production working environment. Specifically, since zirconium acetates, zirconium nitrates, zirconium nitrate oxides or cobalt acetates, cobalt nitrates, etc. are easily changed to zirconium oxides or cobalt oxides at the time of calcination, and the subsequent reduction treatment of the cobalt oxides is also easy, they are preferable.

It is sufficient if the proper range of the loading amount of cobalt is greater than or equal to a lowest amount for exhibiting activity, and is less than or equal to a loading amount such that the degree of dispersion of supported cobalt decreases extremely, and as a result, the ratio of the cobalt which cannot contribute to a reaction increases. Specifically, the loading amount is 5 to 50 mass %, and preferably, 10 to 40 mass %. If the loading amount falls below this range, activity cannot be exhibited satisfactorily, and if the loading amount exceeds this range, the degree of dispersion decreases, and as a result, the use efficiency of supported cobalt is degraded, and so it becomes uneconomical, which is not preferable. The term "loading amount" refers to the ratio of the mass of metal cobalt to the total mass of a catalyst when it is assumed that the supported cobalt has been reduced 100% because the supported cobalt is not limited to be finally reduced 100%.

It is sufficient if the proper range of the loading amount of zirconium loaded along with cobalt is greater than or equal to a lowest amount for exhibiting a water resistance-improving effect, a life-extending effect, an activity-improving effect, and a regeneration-promoting effect, and is less than or equal to a loading amount such that the degree of dispersion of supported zirconium decreases extremely, and as a result, the ratio of the zirconium which does not contribute to exhibiting the effects, to the added zirconium becomes high and becomes uneconomical. Specifically, the molar ratio of cobalt to zirconium is Zr/Co=0.03 to 0.6, and preferably 0.05 to 0.3. If the loading amount falls below this range, a water resistance-improving effect, a life-extending effect, an activity-improving effect, and a regeneration-promoting effect cannot be exhibited satisfactorily, and if the loading amount exceeds this range, the use efficiency of supported zirconium is degraded, and becomes uneconomical, which is not preferable.

In order to exhibit the above-mentioned effects, it is estimated that a catalyst structure in which zirconium oxides exist on a silica support and cobalt particles showing activity exist on zirconium oxides is preferable. Cobalt particles showing activity may be cobalt particles all of which are metalized by reduction treatment, or cobalt particles most of which are metalized but a portion of which has remaining cobalt oxides thereon. It is estimated that the water resistance-improving effect is originated from suppression of oxidation of cobalt particles showing activity by the fact that it becomes easy to hold a reducing atmosphere in a reaction field where by-product water exists by virtue of the oxygen absorption ability of zirconium oxides, in addition to suppression of formation of cobalt silicates which formation is accelerated by by-product water, by reducing the interface between cobalt particles showing activity and the silica support because zirconium oxides exist on the silica support. Additionally, the interaction between zirconium oxides, and cobalt particles showing activity is thought to be greater than the interaction between the silica support, and cobalt particles showing activity. Therefore, it is believed that it becomes relatively difficult for sintering to occur among cobalt particles showing activity in a catalyst in which cobalt compounds and zirconium compounds are supported, and so water resistance is improved even in an atmosphere which the by-product water exists, in which sintering is apt to occur. Additionally, since zirconium oxides easily maintain the reducing atmosphere as described above, precipitation of carbon onto cobalt particles showing activity etc. is also suppressed. It is believed that the life-extending effect is exhibited by the fact that a catalyst structure which exhibits activity can be held longer by virtue of the above water resistance improvement, suppression of sintering, and suppression of precipitation of carbon.

Additionally, it is estimated that, since the interaction between zirconium oxides and cobalt compounds is greater than the interaction between the silica support and cobalt compounds, the exhibition of the activity-improving effect is originated from the fact that, when the catalyst in which cobalt compounds and zirconium compounds are supported is compared with a catalyst in which cobalt compounds, but not zirconium compounds are supported, the degree of dispersion of cobalt is high and the active surface area is large. Additionally, it is believed that exhibition of the regeneration-promoting effect by addition of zirconium is originated from the fact that zirconium oxides easily maintain a reducing atmosphere as described above.

Although loading of cobalt compounds and zirconium compounds on the catalyst support mainly composed of silica can be performed by the aforementioned loading methods, the loading may be performed separately or simultaneously.

When the loading is performed separately, a solution of cobalt compounds and a solution of zirconium compounds are prepared, and then loading on the catalyst support mainly composed of silica is first performed by using one solution, and after drying, or drying and calcination treatment, loading on the catalyst support is further performed by using another solution. After the loading, drying treatment is performed if needed, and subsequently, reduction treatment, or calcination treatment and reduction treatment is performed. By performing such treatments, all cobalt compounds are metalized, or some of cobalt compounds are oxidized and the remaining cobalt compounds are metalized, and further, zirconium compounds are oxidized.

Additionally, as a result of keen study, as for the loading of cobalt compounds and zirconium compounds on the silica support when the loading is performed separately, it became apparent that it is preferable that zirconium compounds and cobalt compounds be loaded sequentially in this order in producing a catalyst, and on the contrary, a catalyst which is loaded in order of cobalt compounds and zirconium compounds degrade the activity-improving effect, the life-extending effect, and the water resistance-improving effect as compared with the former catalyst. As mentioned above, it is believed that this is because zirconium oxides exhibit an improvement in activity by high dispersion of cobalt, and the function of suppressing the formation of cobalt silicates under existence of the by-product water at the interface between cobalt particles showing activity, and the silica support, and it is estimated that this is because the existence of zirconium oxides between cobalt particles showing activity, and the silica support is more effective.

On the other hand, when the loading is performed simultaneously, cobalt compounds and zirconium compounds are simultaneously loaded by a single loading operation since a mixed solution of cobalt compounds and zirconium compounds is prepared and loaded. After the loading, drying treatment is performed if needed, and subsequently, reduction treatment, or calcination treatment and reduction treatment is performed. By performing such treatment, all cobalt compounds are metalized, or some of cobalt compounds are metalized and the remaining cobalt compounds are oxidized, and further, zirconium compounds are oxidized.

However, when the loading is performed simultaneously, it became apparent that water resistance may be degraded instead when compared with the catalyst in which zirconium compounds are not loaded. It is estimated that this is because, in the catalyst loaded simultaneously, cobalt particles showing activity and zirconium oxides take such an unstable form that the surface area of cobalt particles showing activity decreases due to the contact with the by-product water.

The additive amount of zirconium required in order to exhibit satisfactory effects, is extremely increased when a catalyst contains much impurity content, and so it is uneconomical and the satisfactory effects of zirconium can not be obtained. However, with the catalyst of the invention, it was proved that satisfactory and advanced effects are obtained only by adding a small amount of zirconium as described above. Especially, the above effect is remarkable when a catalyst support with little impurity content is used, it is estimated that this is because composite compounds of the silica support and zirconium can be easily formed homogeneously because impurity content is little, and the properties of the surface of the silica support can be efficiently changed by a small amount of zirconium.

Additionally, with the catalyst in which zirconium compounds and cobalt compounds are loaded sequentially, activity is improved as compared with the catalyst in which cobalt compounds, but not zirconium compounds are loaded. When the inventors studied changes in the degree of dispersion of cobalt by the addition of zirconium, it became apparent that the degree of dispersion of cobalt tends to increase with an increase in the loading amount of zirconium. It is inferred that the improvement in activity by the addition of zirconium is originated from the fact that the degree of dispersion of cobalt has increased as described above, and formation of cobalt silicates has been suppressed. Additionally, when the silica support with little impurity content is used, the above effect tends to be further promoted. It is also believed that a result is obtained from the fact that the properties of the surface of the silica support can be homogeneously changed by the addition of a small amount of zirconium because impurity content is little.

Hereinafter, an example of a method for obtaining the above catalyst is shown. First, an aqueous solution of a precursor composed of zirconium compounds is impregnated and supported by a catalyst support with little impurity content mainly composed of silica, an aqueous solution of a precursor composed of cobalt compounds is then loaded, and thereafter, drying, calcination, and reduction treatment are performed if needed, so that an F-T synthesis catalyst can be obtained. After the loading of zirconium compounds, drying treatment (for example, at 100° C. for one hour in air) and calcination treatment (for example, at 450° C. for five hours) may be subsequently performed, or only drying treatment may be performed; and then impregnating and loading cobalt as a next step are performed. In order to keep the addition efficiency of zirconium from being degraded because zirconium compounds are incorporated into cobalt compounds during the impregnating and loading operation of cobalt, zirconium compounds may be converted into zirconium oxides by performing calcination treatment. An F-T synthesis catalyst is obtained by performing drying treatment if needed, after the impregnating and loading of cobalt compounds have been performed, and subsequently reducing cobalt compounds of the surface of the catalyst support to cobalt metal (for example, at 450° C. for 15 hours in a hydrogen stream at normal pressure). However, reduction treatment may be performed after changing to oxides by calcination, or reduction treatment may be directly performed without calcination. In addition, in such reduction treatment, some cobalt compounds are left because they are not reduced. However, in order to exhibit excellent activity, it is preferable that cobalt compounds which are reduced to cobalt metal, be more than cobalt compounds which are not reduced. This can be confirmed by a chemical adsorption method. It is necessary to handle the catalyst after reduction treatment so as to prevent the catalyst from being exposed to the atmosphere and oxidized and deactivated. However, when stabilizing treatment which intercepts the surface of the cobalt metal on the catalyst support from the atmosphere is performed, the handling in the atmosphere becomes possible, which is suitable. As this stabilizing treatment, there is a method of performing so-called passivation (passivation treatment) of exposing nitrogen, carbon dioxide, and inert gas which contain low-concentration oxygen to a catalyst, thereby oxidizing only an extreme surface layer of the cobalt metal on the catalyst support, or a method of dipping it in a reaction solvent, melted FT wax, etc. when the F-T synthesis reaction is to be performed in a liquid phase, thereby intercepting them from the atmosphere. Suitable stabilizing treatment may be performed according to a situation.

Additionally, in terms of an improvement in activity, life extension, and a water resistance improvement, it is very effective to reduce impurities in a catalyst part other than active metals and constituent elements of the catalyst support so as to control them to certain ranges. In a case where the silica of the invention is used as a catalyst support, as described above, alkali metals, such as Na and K, alkaline earth metals, such as Ca and Mg, and Fe, etc. are often contained as impurities in the silica support. When the inventors studied the influence of these impurities in detail by using cobalt as an active metal, the activity in the F-T synthesis reaction decreases greatly if an alkali metal or an alkaline earth metal exists in large amounts. Especially, the influence of the existence of sodium is the strongest.

Although sodium, potassium, calcium, magnesium, and iron which are impurities in the invention exist mainly in the form of compounds, and exist especially in the form of oxides, they may exist in small quantities in metal simple substances or forms other than oxides. In order to exhibit excellent catalytic activity and life, and high water resistance in the catalyst of the invention, it is necessary to suppress the total amount of the impurities in the catalyst to 0.15 mass % or less in terms of metal. If the total amount exceeds this amount, activity decreases greatly. Therefore, disadvantages become significant. In particular, the total amount is preferably less than or equal to 0.03 mass % in terms of metal. However, if the amount of impurities is reduced unduly, an improvement in purity requires cost and becomes uneconomical. Therefore, the amount of impurities in the catalyst is preferably greater than or equal to 0.01 mass % in terms of metal. Since the amount of impurities also depends on a loading amount or the kind of a precursor, it is difficult to limit the amount of impurities in the precursor. However, in order to reduce the amount of impurities in the catalyst, it is effective to reduce the amount of impurities in the precursor of cobalt compounds and zirconium oxides as described above, and it is effective that the content of each element of the alkali metals or the alkaline earth metals be suppressed to 5 mass % or less in terms of metal.

The elements which have the worst effect on the activity of a catalyst among impurities in the catalyst are alkali metals and alkaline earth metals. These metals originate from cleaning water or a starting material which is mainly used in the step of producing the silica support, and therefore, sodium, potassium, magnesium, and calcium often become problematic. FIG. 1 shows results obtained from investigating the relationship between the concentration of sodium in the silica support, and the CO conversion of the F-T synthesis reaction, as an index of catalytic activity, in a case where a catalyst contains zirconium oxides of the invention, and in a case where a catalyst does not contain zirconium as a comparative example. This catalyst which contains zirconium oxides is a catalyst in which zirconium compounds are first loaded on the silica support, and cobalt compounds are subsequently loaded and prepared. As is clear from this drawing, with the catalyst containing zirconium oxides, a decrease in the CO conversion by an increase in concentration of sodium is relatively small, but the tendency of a change caused by the concentration of sodium does not change by the existence/non-existence of containing of zirconium oxides. Additionally, FIG. 2 shows results obtained from investigating the relationship between the concentration of each of sodium and potassium which are alkali metals and calcium and magnesium which are alkaline earth metals, in the silica support, and the CO conversion of the F-T synthesis reaction as an index of catalytic activity, in a case where a catalyst does not contain zirconium oxides (in a case of a catalyst in which cobalt is loaded on the silica support). Within a range in which the content of these metals in the catalyst support falls below 0.01 mass % in terms of metal, influence of the alkali metals and the alkaline earth metals is rarely seen. However, if the content exceeds 0.1 mass % in terms of metal, it can be said that activity decreases gradually. It can be estimated from FIG. 1 that the tendency of a change in the CO conversion by the concentration of the alkali metals and alkaline earth metals is the same irrespective of the existence/non-existence of containing of zirconium oxides. Hence, even in the catalyst of the invention, the content of the metals can also be defined to the same range. Accordingly, the content of each of the alkali metals or alkaline earth metals in the catalyst support is preferably less than or equal to 0.1 mass % in terms of metal, is more preferably less than or equal to 0.07 mass % in terms of metal, is still more preferably less than or equal to 0.04 mass % in terms of metal, and is especially preferably less than or equal to 0.02 mass % in terms of metal. Accordingly, in normal silica support production, the content of each of sodium, potassium, magnesium, and calcium is preferably less than or equal to 0.1 mass % in terms of metal, is more preferably less than or equal to 0.07 mass % in terms of metal, is still more preferably less than or equal to 0.04 mass % in terms of metal, and is especially preferably less than or equal to 0.02 mass % in terms of metal.

As described above, if the total amount of the impurities in the catalyst exceeds 0.15 mass % in terms of metal, the activity of a catalyst decreases greatly. Similarly to the above, it becomes uneconomical to reduce the content of each of the alkali metals or alkaline earth metals in the catalyst support unduly. Therefore, the alkali metals or alkaline earth metals in a catalyst may be contained within a range in which they do not have an adverse effect on catalytic activity. If the content of each of the alkali metals or alkaline earth metals in the catalyst support is reduced to about 0.01 mass % in terms of metal as described above, satisfactory effects are obtained. Therefore, it is preferable from a viewpoint of cost that the content of each element of the alkali metals or alkaline earth metals in the catalyst support be greater than or equal to 0.01 mass % in terms of metal.

In addition, a technique of flameless atomic absorption analysis after a catalyst support and a catalyst have been dissolved using hydrofluoric acid may be used as the method of measuring impurity concentration described herein. Additionally, the impurities contained in the silica support and the other impurities can be distinguished from each other by performing impurities analysis only by the catalyst support, and separately carrying out impurities analysis of the whole catalyst. For example, as for aluminum, it is possible to distinguish aluminum which exists as alumina or zeolite in the silica support from aluminum contained in portions other than the silica support. In addition, in measurement of the impurities in the silica support, the impurities can also be analyzed by ICP emission spectral analysis instead of the flameless atomic absorption analysis.

If a catalyst support which can be prevent from contamination of impurities in a producing process is used, it is preferable to take a measure such that impurities are not mixed during production. Generally, the method for producing silica is roughly classified into a dry method and a wet method. As the dry method, there are a combustion method, an arc method, etc. As the wet method, there are a precipitation method, a gel method, etc. Although it is possible to produce a catalyst support with any producing method, it is technically or economically difficult to mold the catalyst support in a spherical shape by the above methods excluding the gel method. Therefore, the gel method which can spray silica sol in a gas medium or a liquid medium to easily mold it in a spherical shape is preferable.

For example, when the silica support is produced in the above gel method, a lot of cleaning water is usually used. In this case, if cleaning water containing much impurity content, such as industrial water, is used, a lot of impurities will remain in the catalyst support, and the activity of the catalyst decreases sharply, which is not preferable. However, it becomes possible to obtain an excellent silica support with little impurity content by using cleaning water with a low content of impurities or by using cleaning water which does not contain impurities, such as ion-exchange water, at all. In this case, the content of each element of the alkali metals or alkaline earth metals in the cleaning water is preferably less than or equal to 0.06 mass % in terms of metal. If the content exceeds this, the content of impurities in the silica support increases and the activity of the catalyst after preparation decreases greatly. This is not preferable. Ideally, use of the ion-exchange water is preferable. In order to obtain the ion-exchange water, the ion-exchange water may be produced using ion-exchange resin, etc. However, it is also possible to produce the ion-exchange water by performing ion-exchange using silica gel to be generated as a substandard article in a production line for silica. Theoretically, trapping of the impurities in the cleaning water by silica is performed by ion-exchange between hydrogen in silanol on the surface of silica, and impurity ions, such as alkali metal ions or alkaline earth metal ions. Hence, even in the cleaning water which contains little impurity content, it becomes possible to prevent trapping of impurities to some extent by adjusting pH of the cleaning water to low. Additionally, since the amount of ion-exchange (the amount of impurity contamination) is proportional to the amount of cleaning water to be used, it becomes possible to reduce the amount of impurities in the silica support even by reducing the amount of the cleaning water, in other words, by improving the use efficiency of the water till the end of water washing.

When the impurities in the silica support can be reduced by carrying out pretreatments, such as cleaning by water, cleaning by acid, cleaning by alkali, etc., without greatly changing the physical or chemical properties of a catalyst support, these pretreatments are very effective in an improvement in activity of the catalyst.

For example, in cleaning of the silica support, it is especially effective to clean the silica support by acidic aqueous solutions, such as nitric acid, hydrochloric acid, and acetic acid or to clean the silica support by the ion-exchange water. After cleaning treatment by these acids, it is effective to further clean the silica support by pure water, such as the ion-exchange water when some acid remaining in the catalyst support becomes a hindrance.

Additionally, in the production of silica, calcination treatment aiming at an improvement in particle strength, an improvement in activity of surface silanol groups, etc. is performed well. However, if the calcination is performed in a state where impurities are relatively high, it becomes difficult to reduce the content of impurities by cleaning the silica support because impurity elements are incorporated into a silica skeletal structure. Hence, in order to reduce the concentration of the impurities by cleaning the silica support, it is preferable to use non-calcined silica gel.

By using the catalyst and the catalyst support as described above, it is possible to obtain a catalyst with significantly high activity, long life and high water resistance in the F-T synthesis reaction.

In order to keep the degree of dispersion of metal high and improve the efficiency, which contributes to the reaction of supported active metal, it is preferable to use a catalyst support of high specific surface area. However, in order to increase the specific surface area, it is necessary to reduce pore diameter and increase pore volume. However, if these two factors are increased, since attrition resistance or strength will degrade, this is not preferable. As the physical properties of the catalyst support, a catalyst support which satisfies a pore diameter of 8 to 50 nm, a specific surface area of 80 to 550 $m^2/g$, and a pore volume of 0.5 to 2.0 mL/g simultaneously are very preferable as a catalyst support. If the catalyst support is one which satisfies a pore diameter of 8 to 30 nm, a specific surface area of 150 to 450 $m^2/g$ and a pore volume of 0.6 to 1.5 mL/g simultaneously, it is more preferable, and if the catalyst support is one which satisfies a pore diameter of 8 to 20 nm, a specific surface area of 200 to 400 $m^2/g$, and a pore volume of 0.7 to 1.2 mL/g simultaneously, it is still more preferable. The above-mentioned specific surface area can be measured by a BET method, and the pore volume can be measured by the mercury intrusion technique or a water titration method. Additionally, although the pore diameter can be measured by a gas adsorption method, a mercury intrusion technique by a mercury porosimeter, etc., it can be obtained by calculation from the specific surface area and the pore volume.

In order to obtain a catalyst which exhibits satisfactory activity for the F-T synthesis reaction, the specific surface area is required to be greater than or equal to 80 $m^2/g$. If the specific surface area falls below this, since the degree of dispersion of supported metal decreases and the efficiency of contribution of active metals to the reaction degrades, this is not preferable. Additionally, if the specific surface exceeds 550 $m^2/g$, it becomes difficult for the pore volume and the pore diameter to satisfy the above ranges simultaneously, which is not preferable.

As the pore diameter becomes small, it becomes possible to increase the specific surface area. If the pore diameter falls below 8 nm, the diffusion speed of gas in pores differs in hydrogen and carbon monoxide. Consequently, the partial pressure of the hydrogen becomes high toward the insides of the pores, and a light hydrocarbon, such as methane, which can be called a by-product in the F-T synthesis reaction, are generated in large quantities. This is not preferable. In addition, since the diffusion rate of the generated hydrocarbon in pores also decreases, as a result, an apparent reaction rate decreases, this is not preferable. Additionally, if comparison is performed with a fixed pore volume, the specific surface area decreases as the pore diameter increases. Therefore, if the pore diameter exceeds 50 nm, since it becomes difficult to increase the specific surface area, and the degree of dispersion of active metals decreases, this is not preferable.

The pore volume is preferably within a range of 0.5 to 2.0 mL/g. If the pore volume falls below 0.5 mL/g, since it becomes difficult for the pore diameter and the specific surface to satisfy the above ranges simultaneously, this is not preferable. If the pore volume is set to a value exceeding 2.0 mL/g, since strength degrades extremely, this is not preferable.

As described above, an F-T synthesis catalyst for a slurry-bed reactor reaction requires attrition resistance and strength. Additionally, since a lot of water is generated as a by-product in the F-T synthesis reaction, when a catalyst or a catalyst support which is broken and powdered under the existence of water is used, the inconveniences as mentioned above are caused, and therefore, attention is required. Hence, it is preferable to use a spherical catalyst support rather than a crushed catalyst support in which the possibility of being precracked is high, and an acute corner is apt to be damaged and peeled off. When the spherical catalyst support is produced, a spraying method, such as a general spray drying method, may be used. Especially when a spherical silica support with a particle size of about 20 to 250 μm is produced, the spraying method is suitable, and a spherical silica support having excellent attrition resistance, strength, and water resistance is obtained.

A method for producing such a silica support is illustrated below. Silica sol generated under the condition that an alkali silicate aqueous solution and an acid aqueous solution are mixed together and pH is from 2 to 10.5, is gelatinized by spraying into a gas medium, such as air, or into an organic solvent in which the sol is insoluble, and then is subjected to acid treatment, water-washed, and dried. Here, a sodium silicate aqueous solution is suitable as the alkali silicate, the molar ratio of $Na_2O:SiO_2$ is preferably 1:1 to 1:5, and the concentration of silica is preferably 5 to 30 mass %. Although nitric acid, hydrochloric acid, sulfuric acid, organic acid, etc. can be used as the acid to be used, sulfuric acid is preferable from a viewpoint that corrosion of a container is prevented when being produced, and organic matter does not remain. The concentration of the acid is preferably 1 to 10 mol/L. If the concentration falls below this range, the progress of gelation becomes significantly slow. If the concentration exceeds this range, the gelation speed becomes too fast, and the control thereof becomes difficult. As a result, since it becomes difficult to obtain a desired property value, this is not preferable. Additionally, when a method for spraying silica sol into the organic solvent is adopted, kerosene, paraffin, xylene, toluene, etc. can be used as the organic solvent.

If the above constitution or producing method is used, it becomes possible to provide a catalyst for F-T synthesis which exhibits high activity without deteriorating strength or attrition resistance.

Additionally, by using a catalyst for F-T synthesis according to the invention, it becomes possible to perform the F-T synthesis-reaction at low cost with high efficiency and to produce suitable products. That is, when the F-T synthesis reaction is performed in a liquid phase reaction using a slurry-bed reactor by using the catalyst obtained by the invention, the selectivity of liquid products which carbon number is greater than or equal to five, which are major products, is high, and the production speed of the liquid products per the unit mass of the catalyst (hydrocarbon productivity) is also very high. Furthermore, since the degree of powdering of the catalyst during use and also a decrease in activity caused by by-product water, etc. are very small, the invention has the feature that the life of the catalyst is long. From these features, it becomes possible to execute the F-T synthesis reaction at low cost with high efficiency.

If the catalyst according to the invention is used, a decrease in activity caused by by-product water, etc. is very small. Therefore, an excellent F-T synthesis reaction can be performed even under the condition that the one-pass CO conversion at which the partial pressure of the by-product water becomes very high is 60 to 95%. The term "one-pass CO conversion" is the conversion of CO which is obtained only by passing a material-gas through the reactor once, which is different from the case that gas containing unreacted material-gas discharged from the reactor is re-supplied to the reactor. Even if the one-pass CO conversion is as relatively low as 40 to 60%, a decrease in activity caused by by-product water, etc. is very small. Therefore, the life of the catalyst becomes long, and it becomes possible to reduce catalyst cost. If the one-pass CO conversion becomes 40% or less, the facility cost of a tail gas recycling facility increases. Therefore, it is general that operation is performed at 40% or more.

Additionally, when a decrease in activity has occurred because the conversion is significantly high or reaction time is long, the catalyst can be regenerated by supplying gas containing hydrogen instead of syngas. As the method for regenerating a catalyst, there is an inside-reactor regenerating method which supplies a regeneration gas instead of the syngas to the reactor, thereby bringing the catalyst and the regeneration gas into contact with each other, or an outside-reactor regenerating method which extracts a catalyst or slurry containing a catalyst, and then fills a separate container called a regeneration tower with the catalyst or slurry, thereby supplying regeneration gas. Additionally, when an external circulation system in which an F-T synthesis reactor is operated while slurry containing a catalyst is circulated to the outside of a reaction container, is adopted, an in-situ regenerating method in which regeneration gas and slurry containing a catalyst are brought into contact with each other in any of an external circulation portion while an ordinary reaction is continued, can be adopted. However, even in such an operation system, the inside-reactor regenerating method and the outside-reactor regenerating method can also be employed. While the inside-reactor regenerating method has an advantage whereby a regeneration tower facility, or an in-situ regeneration facility becomes unnecessary, it has a drawback that production stops completely during the regeneration operation. Thus, it is necessary to determine a regenerating method in consideration of the cost of a regeneration tower facility or an in-situ regeneration facility, and time required for regeneration (production stopping time), etc. Additionally, when the in-situ regenerating method is adopted, there is an advantage that catalyst regeneration can be performed while production is continued. In addition, the in-situ regenerating method has a drawback such that the contact time between a regeneration gas and a catalyst cannot be so long or the degree of freedom of regeneration conditions is reduced slightly because it is preferable that regeneration pressure, temperature, etc. are made the same as F-T synthesis reaction conditions as mentioned below. However, this in-situ regenerating method is preferable in a case of a reaction process of an external circulation operation type using a catalyst from which a life-extending effect can be expected under regeneration conditions which can be realized in an actual process.

The hydrogen content of the regeneration gas is preferably greater than or equal to 5%, and may be 100%. Otherwise, the regeneration gas may contain inert gas, such as nitrogen or argon. The regeneration conditions are not particularly limited so long as they are conditions under which catalyst regeneration proceeds. As a catalyst regenerating mechanism by bringing a regeneration gas containing hydrogen and a catalyst into contact with each other, those by re-reduction of cobalt oxidized by water and removal of precipitated carbon by hydrogen are inferred.

In the inside-reactor regenerating method in a slurry-bed reactor in which a catalyst is dispersed in a liquid hydrocarbon of a solvent, it is preferable to adopt regeneration conditions (temperature, pressure, time, gas flow rate, etc.) such that a solvent is not lost by the conversion of the liquid hydrocarbon into gas components by hydro-cracking or the vaporization of the liquid hydrocarbon, from a viewpoint of restarting the operation after regeneration. However, when the regeneration is performed under the conditions such that the volume of a solvent decreases, the regeneration may be performed while a solvent which has a high boiling point and does not have an adverse effect on the F-T synthesis reaction, like polyalphaolefine, is being added. When the regeneration is performed by the inside-reactor regenerating method, preferably, regeneration temperature is 100 to 400° C., regeneration pressure is normal pressure to reaction pressure, regeneration time is 5 minutes to 50 hours, and regeneration gas flow rate is such that a hydrogen flow rate in a regeneration gas is almost the same as a hydrogen flow rate in a syngas in a reaction. In the inside-reactor regenerating method, if the regeneration pressure becomes below the reaction pressure, it becomes possible to utilize a compressor for raising the reaction pressure in a reaction, and it is not necessary to install a compressor newly for regeneration. Therefore, this is advantageous from a viewpoint of facility cost.

In the in-situ regenerating method in which a catalyst in a regeneration gas and slurry are brought into contact with each other in any of an external circulation portion while a reaction is continued, when regeneration temperature and pressure different from the F-T synthesis reaction conditions are adopted, a conversion facility of slurry temperature or pressure is newly needed. Therefore, facility cost will increase. Hence, it is preferable to adopt such regeneration conditions if regeneration is possible at the same pressure and temperature as the F-T synthesis reaction conditions. The regeneration gas may be introduced into any part of an external circulation line to perform regeneration. A regeneration-dedicated container may be installed such that the container is provided in the external circulation line, and a regeneration gas is introduced from a bottom of the container. However, when a container, such as a catalyst separating tank, exists in the external circulation line, it is also possible to introduce the regeneration gas into the container to perform regeneration.

In the outside-reactor regenerating method which fills a regeneration tower with an extracted catalyst and then supplies a regeneration gas, it is possible to select a fluidized-bed, a fixed-bed reactor, etc. besides the slurry-bed reactor. However, since it is not necessary to consider hydro-cracking of a solvent in a gas-solid reaction of a fluidized-bed, a fixed-bed reactor, etc., the regeneration temperature may be determined in consideration of regeneration rate and sintering of cobalt. Additionally, the regeneration pressure can be selected not according to the reaction pressure but according to the capability of a compressor of a regeneration facility. However, since the facility cost of the compressor increases as boosting capability increases, it is necessary to take into consideration and determine the pressure dependency of the regeneration rate.

With a catalyst with little impurity content of the invention, it is possible to perform regeneration by the above method even if zirconium is not added. However, the regeneration becomes easier by adding zirconium. In the same regeneration conditions, with a catalyst which added zirconium, the regeneration effects can be exhibited markedly and the regeneration conditions can be set mildly. That is, it becomes possible to set the regeneration temperature low, and it is possible to avoid a relatively high temperature range where hydro-cracking of a solvent occurs in slurry bed reduction, such as in-situ regeneration.

In addition, as the syngas to be used for the F-T synthesis reaction in the invention, a gas of which a sum of hydrogen and carbon monoxide is greater than or equal to 50 volume % of the total is preferable from a viewpoint of productivity, and it is particularly desirable that the molar ratio (hydrogen/carbon monoxide) of hydrogen to carbon monoxide be within a range of 0.5 to 4.0. The reason is as follows. That is, if the molar ratio of hydrogen to carbon monoxide is less than 0.5, since the amount of hydrogen existing in a material-gas is too small, a hydrogenation reaction (F-T synthesis reaction) of carbon monoxide does not progress easily, and the productivity of a liquid hydrocarbon does not become high. On the other hand, if the molar ratio of hydrogen to carbon monoxide exceeds 4.0, since the amount of carbon monoxide existing in the material-gas is too small, the productivity of a liquid hydrocarbon does not become high irrespective of catalytic activity.

EXAMPLES

Although the invention will be described in more detail by means of examples, the invention is not limited to these examples.

1 g of $Co/Zr/SiO_2$ catalyst which was prepared by first loading Zr by the incipient wetness method, and performing drying treatment and calcination treatment, and next by loading Co and performing drying treatment, calcination treatment, reduction treatment, and passivation (the silica support is made by Fuji Silysia Chem. Ltd., and has a spherical form with a mean particle size 100 µm, a Co loading amount of 20 to 30 mass %, and Zr/Co=0 to 0.3), and 50 mL of $n\text{-}C_{16}$ (n-hexadecane) were charged into an autoclave with an internal volume of 300 mL. Thereafter, F (flow rate of syngas ($H_2/CO=2$)) was adjusted so as to obtain W(catalyst mass)/F (syngas flow rate)=3 (g·h/mol), while an agitator was rotated at 800 $min^{-1}$ under the condition of 230° C. and 2.0 MPa-G. Then, the composition of supply gas and autoclave outlet gas was obtained by gas chromatography. Thereby, the CO conversion, $CH_4$ selectivity, $CO_2$ selectivity, and hydrocarbon productivity were obtained.

Additionally, the following experiments were conducted in order to evaluate the water resistance of the catalyst.

1 g of $Co/Zr/SiO_2$ catalyst which was prepared by the aforementioned method, and 50 mL of $n\text{-}C_{16}$ were charged into an autoclave with an internal volume of 300 mL. Thereafter, F (flow rate of syngas ($H_2/CO=2$)) of W/F was adjusted so that the CO conversion first becomes about 60%, while an agitator was rotated at 800 $min^{-1}$ under the condition of 230° C. and 2.0 MPa-G. Then, after several hours of stable operation, $H_2O$ was added to a reaction system by a micro pump so as to become equivalent to the $H_2O$ partial pressure which would be obtained when CO conversion is 90%. Addition of $H_2O$ was stopped after 24-hour operation, and several hours of stable operation was carried out.

The CO conversion, $CH_4$ selectivity, $CO_2$ selectivity, and activity retention rate described in the following examples were calculated by the formulas shown below, respectively.

$$\text{CO CONVERSION (\%)} = \frac{\left[\begin{array}{l}(\text{AMOUNT OF CO SUPPLIED (mol)}) - \\ (\text{AMOUNT OF CO IN REACTOR OUTLET GAS (mol)})\end{array}\right]}{(\text{AMOUNT OF CO SUPPLIED (mol)})} \times 100$$

$$\text{CH}_4 \text{ SELECTIVITY (\%)} = \frac{(\text{AMOUNT OF CH}_4 \text{ GENERATED (mol)})}{(\text{AMOUNT OF CO REACTED (mol)})} \times 100$$

$$\text{CO}_2 \text{ SELECTIVITY (\%)} = \frac{(\text{AMOUNT OF CO}_2 \text{ GENERATED (mol)})}{(\text{AMOUNT OF CO REACTED (mol)})} \times 100$$

$$\text{ACTIVITY RETENTION RATE (\%)} = \frac{\left(\begin{array}{c}\text{CO COVERSION AFTER}\\ \text{STOP OF ADDITION OF } H_2O \text{ (\%)}\end{array}\right)}{(\text{CONVERSION BEFORE ADDITION OF } H_2O \text{ (\%)})} \times 100$$

The effects of the invention will be shown below by means of examples and comparative examples.

In addition, total amounts of alkali metals and alkaline earth metals in catalysts of Tables 1 to 3 are total amounts of simple substances and compounds of sodium, potassium, calcium, and magnesium in terms of metal. It is to be noted herein that, since potassium amount was very small as compared with these, the concentration of potassium was not described as an independent component concentration in a catalyst support in the tables. In addition, the total amounts of impurities in a catalyst show the total amounts of simple substances and compounds of sodium, potassium, calcium, magnesium, and iron in terms of metal. In addition, amounts of aluminum compounds in terms of metal in a silica support are also shown for reference.

Example 1

When the FT synthesis reaction was performed using a catalyst as shown by A of Table 1, the CO conversion was 85.4%, $CH_4$ selectivity was 4.3%, the $CO_2$ selectivity was 2.0%, the productivity of a hydrocarbon which carbon number is five or more was 1.32 (kg-hydrocarbon/kg-catalyst/hr), and the activity retention rate was 80.2%.

Example 2

When the FT synthesis reaction was performed using a catalyst as shown by B of Table 1, the CO conversion was 83.1%, the $CH_4$ selectivity was 4.1%, the $CO_2$ selectivity was 1.7%, the productivity of a hydrocarbon which carbon number is five or more was 1.29 (kg-hydrocarbon/kg-catalyst/hr), and the activity retention rate was 83.1%.

Example 3

When the FT synthesis reaction was performed using a catalyst as shown by C of Table 1, the CO conversion was 82.2%, the $CH_4$ selectivity was 4.5%, the $CO_2$ selectivity was 1.7%, the productivity of a hydrocarbon which carbon number is five or more was 1.27 (kg-hydrocarbon/kg-catalyst/hr), and the activity retention rate was 85.1%.

Example 4

When the FT synthesis reaction was performed using a catalyst as shown by D of Table 1, the CO conversion was 81.2%, the $CH_4$ selectivity was 4.6%, the $CO_2$ selectivity was 1.4%, the productivity of a hydrocarbon which carbon number is five or more was 1.23 (kg-hydrocarbon/kg-catalyst/hr), and the activity retention rate was 87.6%.

Example 5

When the FT synthesis reaction was performed using a catalyst as shown by E of Table 1, the CO conversion was 67.4%, the $CH_4$ selectivity was 5.8%, the $CO_2$ selectivity was 0.9%, the productivity of a hydrocarbon which carbon number is five or more was 1.05 (kg-hydrocarbon/kg-catalyst/hr), and the activity retention rate was 80.3%.

Example 6

When the FT synthesis reaction was performed using a catalyst as shown by F of Table 1, the CO conversion was 77.6%, the $CH_4$ selectivity was 4.9%, the $CO_2$ selectivity was 1.1%, the productivity of a hydrocarbon which carbon number is five or more was 1.19 (kg-hydrocarbon/kg-catalyst/hr), and the activity retention rate was 88.5%.

Example 7

When the FT synthesis reaction was performed using a catalyst as shown by G of Table 2, the CO conversion was 82.0%, the $CH_4$ selectivity was 4.5%, the $CO_2$ selectivity was 1.6%, the productivity of a hydrocarbon which carbon number is five or more was 1.27 (kg-hydrocarbon/kg-catalyst/hr), and the activity retention rate was 93.2%.

Example 8

When the FT synthesis reaction was performed using a catalyst as shown by H of Table 2, the CO conversion was 79.1%, the $CH_4$ selectivity was 4.1%, the $CO_2$ selectivity was 1.1%, the productivity of a hydrocarbon which carbon number is five or more was 1.22 (kg-hydrocarbon/kg-catalyst/hr), and the activity retention rate was 93.8%.

Example 9

When the FT synthesis reaction was performed using a catalyst, as shown by I of Table 2, which was prepared by loading Co and Zr simultaneously and performing reduction treatment and passivation after drying treatment and calcination treatment, the CO conversion was 80.7%, the $CH_4$ selectivity was 4.9%, the $CO_2$ selectivity was 1.5%, the productivity of a hydrocarbon which carbon number is five or more was 1.25 (kg-hydrocarbon/kg-catalyst/hr), and the activity retention rate was 31.1%. The activity retention rate decreased significantly by loading Co and Zr simultaneously.

Example 10

When the FT synthesis reaction was performed using a catalyst, as shown by J of Table 2, which was prepared by loading Co and Zr simultaneously and performing reduction treatment and passivation after drying treatment and calcination treatment, the CO conversion was 76.5%, the $CH_4$ selectivity was 4.3%, the $CO_2$ selectivity was 1.0%, the productivity of a hydrocarbon which carbon number is five or more was 1.21 (kg-hydrocarbon/kg-catalyst/hr), and the activity retention rate was 25.0%. The activity retention rate decreased significantly by loading Co and Zr simultaneously.

Example 11

When the FT synthesis reaction was performed using a catalyst, as shown by H of Table 2, which was prepared by reversing the order of loading of Co and Zr, i.e., first loading Co and performing drying treatment and calcination treatment, and then loading Zr and performing drying treatment, calcination treatment, reduction treatment and passivation, the CO conversion was 74.1%, the $CH_4$ selectivity was 4.9%, the $CO_2$ selectivity was 1.0%, the productivity of a hydrocarbon which carbon number is five or more was 1.16 (kg-hydrocarbon/kg-catalyst/hr), and the activity retention rate was 89.1%. When this example is compared with the catalyst, as described in Example 7, which was prepared by first loading Zr and performing drying treatment and calcination treatment, and then loading Co and performing drying treatment, calcination treatment, reduction treatment and passivation, the catalyst compositions was the same. However, the activity retention rate of this example in reaction activity and water resistance experiments decreased. It is believed that the reason is as follows. That is, with the catalyst which is first loaded with Zr and then loaded with Co, zirconium oxides exist at an interface between cobalt particles showing activity, and the silica support. Therefore, the degree of dispersion of cobalt is improved, and a cobalt silicate formation suppressing function is exhibited under the existence of by-product water. Here, as compared with the catalyst of Comparative Example 2 which is not loaded with Zr, even with the catalyst which is first loaded with Co and then loaded with Zr, activity is improved a little, water resistance is also improved, and it is estimated that the maintenance of an reducing atmosphere by zirconium oxides is contributed to.

Example 12

When the FT synthesis reaction was performed using a catalyst as shown by B of Table 1, under the condition that W/F is 1.5 g·h/mol, the CO conversion was 72.9%, the $CH_4$ selectivity was 4.2%, the $CO_2$ selectivity was 0.6%, and the productivity of a hydrocarbon which carbon number is five or more was 2.25 (kg-hydrocarbon/kg-catalyst/hr).

Example 13

1 g of a catalyst and 50 mL of n-$C_{16}$ were charged into an autoclave with an internal volume of 300 mL. Thereafter, F (flow rate of syngas ($H_2$/CO=2)) of W/F was adjusted so that the CO conversion first becomes about 60%, while an agitator is rotated at 800 $min^{-1}$ under the condition of 230° C. and 2.0 MPa-G. Then, after twenty four hours of stable operation, W/F was increased by reducing F of W/F so that the CO conversion exceeds 90%. Then, the catalyst was held in a state where activity is apt to decrease. After 24-hour operation in this state, return to the first W/F is made and a decrease in activity was confirmed. Thereafter, catalyst regeneration was performed in-situ by maintaining pressure, and lowering temperature to 150° C., and supplying hydrogen at 50 ml/min. After holding in this state for 30 hours, the F-T synthesis reaction was performed by supplying the syngas so as to obtain the first W/F, and raising temperature to 230° C.

When the catalyst regeneration experiment shown above was performed using the catalyst as shown by B of Table 1, the first CO conversion was 63.0%, the CO conversion when being set to the first W/F again after a decrease in activity at high W/F was 44.3%, and the CO conversion after regeneration by hydrogen was 51.0%. Although the activity decreased and the CO conversion decreased 18.7% by exposing the catalyst to a high W/F condition, the CO conversion was recovered 6.7% by the regeneration by hydrogen.

Comparative Example 1

When the FT synthesis reaction was performed using a catalyst as shown by L of Table 3, the CO conversion was 81.6%, the $CH_4$ selectivity was 4.6%, the $CO_2$ selectivity was 1.5%, the productivity of a hydrocarbon which carbon number is five or more was 1.22 (kg-hydrocarbon/kg-catalyst/hr), and the activity retention rate was 77.7%.

Comparative Example 2

When the FT synthesis reaction was performed using a catalyst as shown by M of Table 3, the CO conversion was 69.5%, the $CH_4$ selectivity was 5.3%, the $CO_2$ selectivity was 0.9%, the productivity of a hydrocarbon which carbon number is five or more was 1.07 (kg-hydrocarbon/kg-catalyst/hr), and the activity retention rate was 75.6%.

Comparative Example 3

When the FT synthesis reaction was performed using a catalyst as shown by N of Table 3, the CO conversion was 55.2%, the $CH_4$ selectivity was 6.2%, the $CO_2$ selectivity was 1.4%, the productivity of a hydrocarbon which carbon number is five or more was 0.81 (kg-hydrocarbon/kg-catalyst/hr), and the activity retention rate was 80.9%.

Comparative Example 4

When the FT synthesis reaction was performed using a catalyst as shown by O of Table 3, the CO conversion was 32.3%, the $CH_4$ selectivity was 8.0%, the $CO_2$ selectivity was 1.1%, the productivity of a hydrocarbon which carbon number is five or more was 0.46 (kg-hydrocarbon/kg-catalyst/hr), and the activity retention rate was 85.8%.

Comparative Example 5

When the FT synthesis reaction was performed using a catalyst as shown by P of Table 3, the CO conversion was 24.1%, the $CH_4$ selectivity was 7.3%, the $CO_2$ selectivity was 1.5%, the productivity of a hydrocarbon which carbon number is five or more was 0.34 (kg-hydrocarbon/kg-catalyst/hr), and the activity retention rate was 82.9%.

Comparative Example 6

When the FT synthesis reaction was performed using a catalyst as shown by Q of Table 3, the CO conversion was 8.3%, the $CH_4$ selectivity was 9.0%, the $CO_2$ selectivity was 1.5%, the productivity of a hydrocarbon which carbon number is five or more was 0.12 (kg-hydrocarbon/kg-catalyst/hr), and the activity retention rate was 81.1%.

Comparative Example 7

When the catalyst regeneration experiment shown in Example 13 was performed using the catalyst as shown by L of Table 3, the first CO conversion was 62.4%, the CO conversion after a decrease in activity at high W/F was 36.3%, and the CO conversion after regeneration by hydrogen was 41.4%. Although the activity decreased and the CO conversion decreased 26.1% by exposing the catalyst to a high W/F condition, the CO conversion was recovered 5.1% by the regeneration by hydrogen.

Comparative Example 8

When the catalyst regeneration experiment shown in Example 13 was performed using the catalyst as shown by N of Table 3, the first CO conversion was 60.2%, the CO conversion when being set to the first W/F again after a decrease in activity at high W/F was 37.5%, and the CO conversion after regeneration by hydrogen was 42.7%. Although the activity decreased and the CO conversion decreased 22.7% by exposing the catalyst to a high W/F condition, the CO conversion was recovered 5.2% by the regeneration by hydrogen.

TABLE 1

|  | Example |  |  |  |  |  |
|---|---|---|---|---|---|---|
|  | 1 | 2 | 3 | 4 | 5 | 6 |
| Catalyst | A | B | C | D | E | F |
| Na concentration in catalyst support (ppm) | 110 | 110 | 110 | 110 | 110 | 110 |
| Ca concentration in catalyst support (ppm) | 70 | 70 | 70 | 70 | 70 | 70 |
| Mg concentration in catalyst support (ppm) | 17 | 17 | 17 | 17 | 17 | 17 |
| Fe concentration in catalyst support (ppm) | 27 | 27 | 27 | 27 | 27 | 27 |
| Al concentration in catalyst support (ppm) | 83 | 83 | 83 | 83 | 83 | 83 |
| Total amount of alkali metals and alkaline earth metals in catalyst (ppm) | 134 | 126 | 113 | 101 | 157 | 155 |
| Total amount of impurities in catalyst (ppm) | 153 | 143 | 129 | 115 | 178 | 176 |
| Loading amount of Co (%) | 30 | 30 | 30 | 30 | 20 | 20 |
| Molar ratio of Zr/Co | 0.03 | 0.1 | 0.2 | 0.3 | 0.01 | 0.03 |
| W/F (g·h/mol) | 3.0 | 3.0 | 3.0 | 3.0 | 3.0 | 3.0 |
| CO conversion (%) | 85.4 | 83.1 | 82.2 | 81.2 | 67.4 | 77.6 |
| $CH_4$ selectivity (%) | 4.3 | 4.1 | 4.5 | 4.6 | 5.8 | 4.9 |
| $CO_2$ selectivity (%) | 2.0 | 1.7 | 1.7 | 1.4 | 0.9 | 1.1 |
| C5+hydrocarbon productivity[1] (kg-hydrocarbon/kg-catalyst/hr) | 1.32 | 1.29 | 1.27 | 1.23 | 1.05 | 1.19 |
| Activity retention rate (%) | 80.2 | 83.1 | 85.1 | 87.6 | 80.3 | 88.5 |

[1] Productivity of a hydrocarbon which carbon number is 5 or more

TABLE 2

|  | Example |  |  |  |  |  |
|---|---|---|---|---|---|---|
|  | 7 | 8 | 9 | 10 | 11 | 12 |
| Catalyst | G | H | I | J | K | B |
| Na concentration in catalyst support (ppm) | 110 | 110 | 110 | 110 | 110 | 110 |
| Ca concentration in catalyst support (ppm) | 70 | 70 | 70 | 70 | 70 | 70 |
| Mg concentration in catalyst support (ppm) | 17 | 17 | 17 | 17 | 17 | 17 |
| Fe concentration in catalyst support (ppm) | 27 | 27 | 27 | 27 | 27 | 27 |
| Al concentration in catalyst support (ppm) | 83 | 83 | 83 | 83 | 83 | 83 |
| Total amount of alkali metals and alkaline earth metals in catalyst (ppm) | 149 | 133 | 126 | 149 | 149 | 126 |
| Total amount of impurities in catalyst (ppm) | 170 | 151 | 143 | 170 | 170 | 143 |
| Loading amount of Co (%) | 20 | 20 | 30 | 20 | 20 | 30 |
| Molar ratio of Zr/Co | 0.1 | 0.3 | 0.1 | 0.1 | 0.1 | 0.1 |
| W/F (g·h/mol) | 3.0 | 3.0 | 3.0 | 3.0 | 3.0 | 1.5 |
| CO conversion (%) | 82.0 | 79.1 | 80.7 | 76.5 | 74.1 | 72.9 |
| $CH_4$ selectivity (%) | 4.5 | 4.1 | 4.9 | 4.3 | 4.9 | 4.2 |
| $CO_2$ selectivity (%) | 1.6 | 1.1 | 1.5 | 1.0 | 1.0 | 0.6 |
| C5+hydrocarbon productivity[1] (kg-hydrocarbon/kg-catalyst/hr) | 1.27 | 1.22 | 1.25 | 1.21 | 1.16 | 2.25 |
| Activity retention rate (%) | 93.2 | 93.8 | 31.1 | 25.0 | 89.1 | 83.1 |

[1] Productivity of a hydrocarbon which carbon number is 5 or more

TABLE 3

| Comparative example | 1 | 2 | 3 | 4 | 5 | 6 |
|---|---|---|---|---|---|---|
| Catalyst | L | M | N | O | P | Q |
| Na concentration in catalyst support (ppm) | 110 | 110 | 2100 | 2100 | 2100 | 2100 |
| Ca concentration in catalyst support (ppm) | 70 | 70 | 250 | 250 | 250 | 250 |
| Mg concentration in catalyst support (ppm) | 17 | 17 | 100 | 100 | 100 | 100 |
| Fe concentration in catalyst support (ppm) | 27 | 27 | 27 | 27 | 27 | 27 |
| Al concentration in catalyst support (ppm) | 83 | 83 | 83 | 83 | 83 | 83 |
| Total amount of alkali metals and alkaline earth metals in catalyst (ppm) | 138 | 158 | 1561 | 1858 | 1715 | 1960 |
| Total amount of impurities in catalyst (ppm) | 157 | 179 | 1579 | 1878 | 1734 | 1982 |
| Loading amount of Co (%) | 30 | 20 | 30 | 20 | 30 | 20 |
| Molar ratio of Zr/Co | 0 | 0 | 0.1 | 0.1 | 0 | 0 |
| W/F (g·h/mol) | 3.0 | 3.0 | 3.0 | 3.0 | 3.0 | 3.0 |
| CO conversion (%) | 81.6 | 69.5 | 55.2 | 32.3 | 24.1 | 8.3 |
| $CH_4$ selectivity (%) | 4.6 | 5.3 | 6.2 | 8.0 | 7.3 | 9.0 |
| $CO_2$ selectivity (%) | 1.5 | 0.9 | 1.4 | 1.1 | 1.5 | 1.5 |
| C5+hydrocarbon productivity[1] (kg-hydrocarbon/kg-catalyst/hr) | 1.22 | 1.07 | 0.81 | 0.46 | 0.34 | 0.12 |
| Activity retention rate (%) | 77.7 | 75.6 | 80.9 | 85.8 | 82.9 | 81.1 |

[1] Productivity of a hydrocarbon which carbon number is 5 or more

INDUSTRIAL APPLICABILITY

According to the invention, a catalyst which is improved in the activity of a catalyst for producing a hydrocarbon from a syngas; suppresses a decrease in activity caused by sintering, precipitation of carbons or by-product water; is capable of being stably used even under the condition of a high CO conversion where by-product water is generated in large quantities; and is long in catalyst life, a method for producing such a catalyst, a method for regenerating such a catalyst, and a method for producing a hydrocarbon by using such a catalyst are provided. In this respect, the industrial applicability of the invention is apparent.

The invention claimed is:

1. A catalyst for producing a hydrocarbon from a syngas in a liquid phase reaction using a slurry-bed reactor, which comprises cobalt compounds selected from the group consisting of (i) cobalt metal and (ii) cobalt metal and cobalt oxides and zirconium oxides supported by a catalyst support mainly composed of silica,
    wherein a content of impurities containing alkali metals and/or alkaline earth metals in the catalyst support is from 0.01 to 0.1 mass % in terms of metal,
    the content of each of sodium, potassium, calcium, and magnesium among the impurities contained in the catalyst support is less than or equal to 0.07 mass %;
    the catalyst is produced by loading said cobalt compounds and said zirconium oxides separately on said catalyst support using an impregnation method, an incipient wetness method, a precipitation method, or an ion-exchange method, wherein after loading a first of said cobalt compounds and said zirconium oxides, a drying treatment or a drying treatment and a calcination treatment are performed, and after loading a remaining of said cobalt compounds and said zirconium oxides, a reduction treatment or a calcination treatment and a reduction treatment are performed,
    the loading amount of cobalt metal, or cobalt metal and cobalt oxides in the catalyst is 10 to 40 mass % in terms of cobalt metal, and the loading amount of zirconium oxides is 0.03 to 0.3 in the molar ratio of Zr/Co, and
    the catalyst support is spherical and has a mean particle size of 20 to 250 μm.

2. The catalyst for producing a hydrocarbon from a syngas according to claim 1,
    wherein the impurities containing alkali metals and/or alkaline earth metals are simple substances and compounds of sodium, potassium, calcium, and magnesium.

3. The catalyst for producing a hydrocarbon from a syngas according to claim 1,
    wherein the content of impurities in the catalyst is from 0.01 mass % to 0.03 mass %.

4. The catalyst for producing a hydrocarbon from a syngas according to claim 1,
    wherein the content of each of sodium, potassium, calcium, and magnesium among the impurities contained in the catalyst support is less than or equal to 0.02 mass %.

5. A method for producing the catalyst according to claim 1 for producing a hydrocarbon from a syngas,
    wherein the catalyst is produced by causing cobalt compounds and zirconium compounds to be simultaneously supported by the catalyst support mainly composed of silica by using an impregnation method, an incipient wetness method, a precipitation method, or an ion-exchange method, and then by performing reduction treatment, or calcination treatment and reduction treatment.

6. A method for producing the catalyst according to claim 1 for producing a hydrocarbon from a syngas,
    wherein the catalyst is produced by causing cobalt compounds and zirconium compounds to be separately supported by the catalyst support mainly composed of silica by using an impregnation method, an incipient wetness method, a precipitation method, or an ion-exchange method, and after loading of a first compounds, drying treatment, or drying treatment and calcination treatment is performed, and after loading of another remaining compounds, reduction treatment, or calcination treatment and reduction treatment is performed.

7. The method for producing a catalyst for producing a hydrocarbon from a syngas according to claim 6,
wherein, in the separately loaded compounds, the first loaded compounds are zirconium compounds and the other remaining loaded compounds are cobalt compounds.

8. The method for producing a catalyst for producing a hydrocarbon from a syngas according to claim 5,
wherein the loaded zirconium compounds and cobalt compounds, as raw materials for production in the impregnation method, the incipient wetness method, the precipitation method, or the ion-exchange method, contain alkali metals or alkaline earth metals within a range of 5 mass % or less.

9. The method for producing a catalyst for producing a hydrocarbon from a syngas according to claim 5,
wherein the catalyst support mainly composed of silica is produced by gelating silica sol generated by mixing an alkali silicate aqueous solution and an acid aqueous solution together, subjecting the resulting product to at least any one of acid treatment and water washing treatment, and then drying it.

10. The method for producing a catalyst for producing a hydrocarbon from a syngas according to claim 9,
wherein water in which content of alkali metals or alkaline earth metals is less than or equal to 0.06 mass % is used in at least any one of the acid treatment and the water washing treatment after the gelation of the silica sol.

11. The method for producing a catalyst for producing a hydrocarbon from a syngas according to claim 9,
wherein the gelation is performed by spraying the silica sol into a gas medium or a liquid medium to mold the silica sol in a spherical shape.

12. The method for producing a catalyst for producing a hydrocarbon from a syngas according to claim 5,
wherein the cobalt compounds and the zirconium compounds are supported by the catalyst support mainly composed of silica after the concentration of the impurities is reduced by performing cleaning by using at least any one of water, acid, and alkali.

13. The method for producing a catalyst for producing a hydrocarbon from a syngas according to claim 12,
wherein the cleaning uses one or both of acid and ion-exchange water.

14. A method for producing a hydrocarbon from a syngas by using the catalyst according to claim 1,
wherein synthesis is carried out by a liquid-phase reaction using a slurry-bed reactor.

15. A method for producing a hydrocarbon from a syngas by using the catalyst according to claim 1,
wherein synthesis is carried out by a liquid-phase reaction using a slurry-bed reactor with an external circulation system.

16. The method for producing a hydrocarbon from a syngas according to claim 14,
wherein, in the liquid-phase reaction, catalyst amount, material-gas supply amount, reaction temperature, and reaction pressure are adjusted, and a one-pass CO conversion is set to be between 40 and 95%.

17. The method for producing a hydrocarbon from a syngas according to claim 14,
wherein, in the liquid-phase reaction, catalyst amount, material-gas supply amount, reaction temperature, and reaction pressure are adjusted, and a one-pass CO conversion is set to be between 60 and 95%.

18. A method for regenerating a catalyst which activity has decreased after a hydrocarbon is produced from a syngas by using the catalyst according to claim 1,
wherein the catalyst which activity has decreased is supplied with a regeneration gas containing hydrogen, and thereby, the catalyst and the regeneration gas are brought into contact with each other.

19. A method for regenerating a catalyst which activity has decreased after a hydrocarbon is produced from a syngas within the reactor, which is filled with the catalyst according to claim 1,
wherein the reactor is supplied with a regeneration gas containing hydrogen, and thereby, the catalyst and the regeneration gas are brought into contact with each other.

20. A method for regenerating a catalyst which activity has decreased after a hydrocarbon is produced from a syngas by the method according to claim 15,
wherein any of an external circulation portion is supplied with a regeneration gas containing hydrogen, and thereby, the catalyst and the regeneration gas are brought into contact with each other.

21. The method for producing a catalyst for producing a hydrocarbon from a syngas according to claim 6,
wherein the loaded zirconium compounds and cobalt compounds, as raw materials for production in the impregnation method, the incipient wetness method, the precipitation method, or the ion-exchange method, contain alkali metals or alkaline earth metals within a range of 5mass % or less.

22. The method for producing a catalyst for producing a hydrocarbon from a syngas according to claim 6,
wherein the catalyst support mainly composed of silica is produced by gelating silica sol generated by mixing an alkali silicate aqueous solution and an acid aqueous solution together, subjecting the resulting product to at least any one of acid treatment and water washing treatment, and then drying it.

23. The method for producing a catalyst for producing a hydrocarbon from a syngas according to claim 22,
wherein water in which content of alkali metals or alkaline earth metals is less than or equal to 0.06mass % is used in at least any one of the acid treatment and the water washing treatment after the gelation of the silica sol.

24. The method for producing a catalyst for producing a hydrocarbon from a syngas according to claim 22,
wherein the gelation is performed by spraying the silica sol into a gas medium or a liquid medium to mold the silica sol in a spherical shape.

25. The method for producing a catalyst for producing a hydrocarbon from a syngas according to claim 6,
wherein the cobalt compounds and the zirconium compounds are supported by the catalyst support mainly composed of silica after the concentration of the impurities is reduced by performing cleaning by using at least any one of water, acid, and alkali.

26. The method for producing a catalyst for producing a hydrocarbon from a syngas according to claim 25,
wherein the cleaning uses one or both of acid and ion-exchange water.

27. The method for producing a hydrocarbon from a syngas according to claim 15,
wherein, in the liquid-phase reaction, catalyst amount, material-gas supply amount, reaction temperature, and reaction pressure are adjusted, and a one-pass CO conversion is set to be between 40 and 95%.

28. The method for producing a hydrocarbon from a syngas according to claim 15,
wherein, in the liquid-phase reaction, catalyst amount, material-gas supply amount, reaction temperature, and reaction pressure are adjusted, and a one-pass CO conversion is set to be between 60 and 95%.

29. The catalyst for producing a hydrocarbon from a syngas according to claim 1,
wherein said first of said cobalt compounds and said zirconium oxides are said zirconium oxides, and said remaining of said cobalt compounds and said zirconium oxides are said cobalt compounds.

30. The catalyst for producing a hydrocarbon from a syngas according to claim 1,
wherein the zirconium compounds for producing the catalyst are zirconium acetates, zirconium nitrates, and zirconium nitrate oxides.

31. The catalyst for producing a hydrocarbon from a syngas according to claim 1,
wherein an activity retention rate of the catalyst is 80.2% or more, and the activity retention rate is calculated by the following formulae:

$$CO \text{ CONVERSION } (\%) = \frac{\left[\begin{array}{l}(\text{AMOUNT OF } CO \text{ SUPPLIED } (mol)) - \\ (\text{AMOUNT OF } CO \text{ IN REACTOR} \\ \text{OUTLET GAS}(mol)\end{array}\right]}{(\text{AMOUNT OF } CO \text{ SUPPLIED } (mol))} \times 100$$

$$\text{ACTIVITY RETENTION RATE } (\%) = \frac{\left(\begin{array}{l}CO\text{CONVERSION AFTER STOP OF} \\ \text{ADDITION OF } H_2O(\%)\end{array}\right)}{(CO\text{CONVERSION BEFORE ADDITION OF } H_2O(\%))} \times 100.$$

* * * * *